(12) United States Patent
Gunning et al.

(10) Patent No.: US 7,254,091 B1
(45) Date of Patent: Aug. 7, 2007

(54) METHOD FOR ESTIMATING AND/OR REDUCING UNCERTAINTY IN RESERVOIR MODELS OF POTENTIAL PETROLEUM RESERVOIRS

(75) Inventors: James Stuart Gunning, Brunswick East (AU); Michael Edwin Glinsky, Houston, TX (US); Christopher David White, Baton Rouge, LA (US)

(73) Assignee: BHP Billiton Innovation Pty Ltd., Melbourne, Victoria (AU)

( * ) Notice: Subject to any disclaimer, the term of this patent is extended or adjusted under 35 U.S.C. 154(b) by 0 days.

(21) Appl. No.: 11/450,035

(22) Filed: Jun. 8, 2006

(51) Int. Cl.
*G01V 1/00* (2006.01)
(52) U.S. Cl. .......................... 367/73; 702/14
(58) Field of Classification Search ............. 367/73; 702/14
See application file for complete search history.

(56) References Cited

U.S. PATENT DOCUMENTS 5,586,066 A * 12/1996 White et al. ............... 702/181
2006/0058965 A1 * 3/2006 Ricard et al. ............... 702/14
2006/0241920 A1 * 10/2006 Le Ravalec-Dupin et al. .. 703/2

OTHER PUBLICATIONS

Eide et al. Stochastic Reservoir Characterization Conditioned on Seismic Data. Geophysics. vol. 69, No. 4, pp. 824-836. 2003.*
Diggle et al. Bayesian Inference in Gaussian MOdel-based Geostatistics. Geographical & Environmental Modeling. vol. 6, No. 2. 2002. 129-46.□□*
Diet et al. Integration of an Inverted Seismic Volume into a Stochastic Resevoir Model. 2003.*

* cited by examiner

*Primary Examiner*—Deandra Hughes
(74) *Attorney, Agent, or Firm*—Koppel, Patrick, Heybl & Dawson

(57) ABSTRACT

A method for estimating and/or reducing uncertainty in reservoir models of potential petroleum reservoirs comprises receiving the results of a stochastic seismic inversion, and transforming the inversion data into a form suitable for reservoir modelling and flow simulations, while honoring inter-property and inter-layer correlations in the inversion data as well as measured well data and other geological constraints.

21 Claims, 12 Drawing Sheets a) Seismic trace array  b) Cornerpoint grid corners, segment -coded a) NG realisation       b) Decorated sand/shale realisations

METHOD FOR ESTIMATING AND/OR REDUCING UNCERTAINTY IN RESERVOIR MODELS OF POTENTIAL PETROLEUM RESERVOIRS

The present invention relates to the general area of the analysis and interpretation of subsurface regions on the basis of seismic data, and in particular to the processing of seismic inversion data for use in reservoir models.

BACKGROUND OF THE INVENTION

At the time an oil or gas field is being appraised or developed, the development of a reservoir model usually centers on the task of building computer models suitable for forward flow simulation. Prior to this, much of the work will have focused on data acquisition and interpretation, and the construction of models suitable for simple volumetric calculations or drilling decisions. In particular, much of the interpretative work will be based on surface seismic data, and this is routinely fed into various inversion routines which produce pointwise (trace-local) estimates of the properties of direct interest, such as surface positions, layer thicknesses, hydrocarbon content, net-to-gross (NG or $N_G$), etc.

In previous publications (Gunning and Glinsky, 2004, 2005; Gunning, 2003), the inventors have introduced an open source tool Delivery that enables users to perform a fully probabilistic seismic inversion for a layer-based model of the reservoir. This is a trace-based inversion, so it produces an ensemble of realisations of the relevant reservoir parameters at each point in the imaged seismic grid over a field. The 'meso-scale' layer resolution is usually around 5-20 m. At each 'common mid-point' (CMP) location, the inversion provides a full joint-probability distribution of quantities like the layer thicknesses, fluid content, NG, layer times, and velocities. The seismic inversion data produced by Delivery is an array of trace-local stochastic samples from a Bayesian posterior distribution of reservoir layer parameters, which contains complex correlations between layers boundaries, rock properties and fluid information, but no transverse correlations. This inversion data produced by the program is suitable for answering the simple kind of questions mentioned above, such as pointwise histograms of layer thickness, maps of hydrocarbon probability etc, but is not directly suitable for flow calculations per se.

In the past, trend maps have been formed from the results of seismic inversion for properties such as porosity and net sand. These trend maps have then been used to control the geostatistical population of properties and/or objects into the reservoir simulation model. However, none of the rich inter-property and inter-layer correlations were respected. The models have also tended to be built at extremely fine scale (less then a few meters) then upscaled to a coarser scale for reservoir simulation (less than tens of meters).

It would therefore be desirable to provide a method for converting seismic inversion data into a form suitable for use in reservoir models for flow simulation and/or volumetric calculations, while preserving the correlations available from the seismic inversion, and also honouring measured well data and preferably other geological constraints. In particular, it would be desirable to provide such a method which makes it possible to estimate and/or reduce uncertainty in the reservoir model.

SUMMARY OF THE INVENTION

A new and improved method is disclosed for estimating and/or reducing uncertainty in reservoir models of potential petroleum reservoirs, on the basis of seismic inversion information. The method provides for the conversion of the results of a stochastic seismic inversion into a set of realisations of a plurality of properties suitable for use in a reservoir model, while preserving inter-property and inter-layer correlations to reduce uncertainty. Geological constraints and well measurements may also be honoured in the realisations.

More specifically, the method comprises the steps of:
(a) receiving the results of a stochastic seismic inversion which provides output ensembles in respect of a plurality of properties on the basis of imaged seismic data obtained at points on an imaged seismic input grid over a region to be modelled, the output ensembles including information regarding the values of the plurality of properties at points on the input grid for a sequence of model layers, including means and covariances for the properties,
(b) assembling information regarding an observed fault structure in the region,
(c) assembling well log data in respect of one or more properties, obtained from well locations within the region,
(d) modifying the geometry of the input grid to form an output grid for each layer, based on the observed fault structure and the seismic inversion results,
(e) interpolating the values of the plurality of properties from the points on the input grid onto the output grid,
(f) spatially smoothing the means and covariances of the output ensembles to produce a smooth trend map for each property and a smooth inter-property trend covariance,
(g) performing a kriging adjustment of the property trends on the basis of the well log data so that the trends pass through the well log data,
(h) simulating a set of spatially correlated random fields on the output grid for each property, and generating a set of realisations for each property on the basis of the random fields, the smooth inter-property trend covariance and the property trend maps, which honour inter-property and inter-layer correlations from the seismic inversion and measured well data, and
(i) using the generated realisations in a reservoir model to conduct flow simulation and/or volumetric calculations in respect of the region.

Preferably, the method further comprises the step of simulating the spatial dispersion of material within a layer of the seismic inversion by vertically subdividing the layer and modelling a vertical distribution of impermeable material within the layer consistently with a vertical average of impermeable material content obtained from the seismic inversion. This allows the output realisations to capture the effect on fluid flow of the dispersion of impermeable material, or shale, within the region to be modelled.

For the calculation of volumetric (not pointwise) uncertainties, and the task of flow simulation, it is necessary to carry the inversion calculations over to grid formats that are more directly useful in 3D volumetric calculations and flow calculations. Various types of 3D grids are in common use, but perhaps the most ubiquitous is the cornerpoint grid, which is used in the commercially dominant ECLIPSE family of flow simulators (see Schlumberger ECLIPSE website: http://www.slb.com/content/services/software/reseng/eclipse_simulators/index.asp). The cornerpoint grid is therefore preferably used in the present embodiment of the invention. Moreover, the effect of intertrace correlations in the seismic data (which is deliberately neglected in Delivery) can be approximately modelled in this remapping calculation. The aim is to produce 3D models that capture both transverse correlations known from either well data or analogues, and the vertical inter-layer and inter-property correlations that seismic inversion can reveal. The joint process of remapping and merging of correlations is one which has been dubbed 'massaging', and the software implementation of the embodiment of the invention is referred to as DeliveryMassager.

Since the inversion models are probabilistic, it is natural for the remapped or 'massaged' models to inherit this probabilistic character. Objects of interest will then naturally be the 'most likely' massaged model, as well as a suite of 'realisation' models, which enable stochastic forward flow simulations to be performed for risking purposes. Volumetric statistics of interest can of course be calculated oil the fly as well.

BRIEF DESCRIPTION OF THE DRAWINGS

Further embodiments, advantages, features and details of the present invention will be set out in the following description with reference to the drawings, in which.

DETAILED DESCRIPTION

Figure 1:
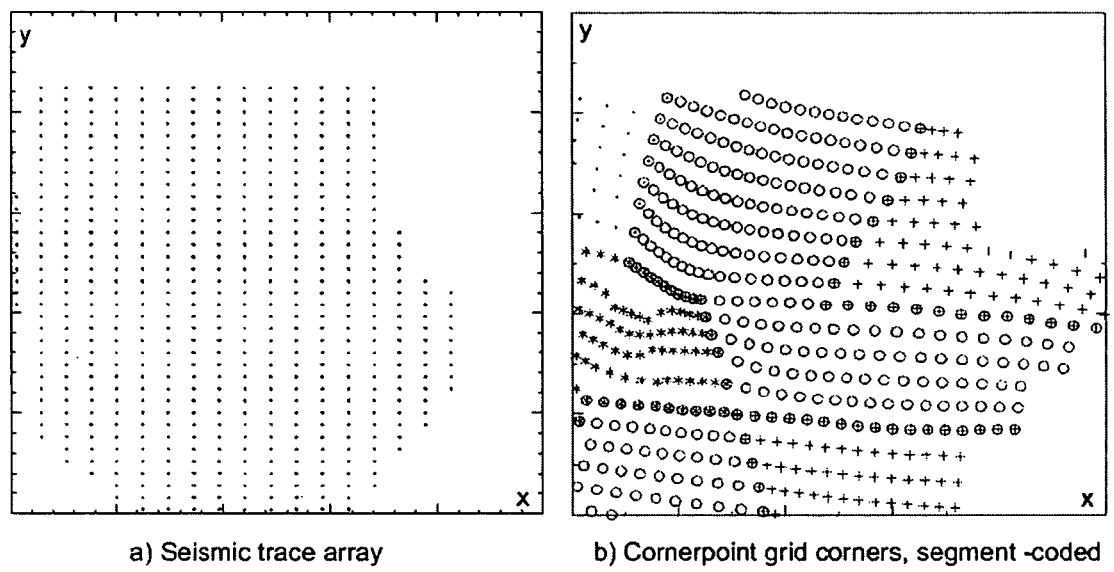
FIG. 1(a) shows a typical layout of an input-grid trace array for seismic inversion.
FIG. 1(b) shows a typical output grid for a particular layer.

The present invention can be embodied in many different forms. The disclosure and description of the invention in the drawings and in this description are illustrative and explanatory thereof, and various changes in the sequence of processing steps, of the parameters in the processing and of the process details may be made without departing from the scope of the invention.

The conceptual problem will first be defined in more detail.

The trace-based Bayesian inversion model implemented by Delivery is a typical input to the method in one embodiment of the invention, and produces an ensemble of realisations from the posterior distribution of the model parameters at each common midpoint (CMP) gather, or trace, of the imaged seismic data. At each trace, the inversion model is quasi 1d, with a sequence of layers parametrised by times describing the (local) geometry, and each layer is characterised by a laminated mixture of permeable and impermeable rocks, with rock velocities, density, porosity and fluid content as additional model parameters. The depths of each layer are computed from relative traveltimes and velocities, hung from a nominated reference layer and supplied reference depth. For the purposes of reservoir simulation, the model parameters of interest are typically the layer depth 'd', the 'thickness', 'net-to-gross NG' (or $N_G$), fluid content 'net-hydrocarbon', and 'porosity' (to name the interesting quantities accessible from Delivery inversions in inverted commas). The Monte Carlo ensemble produced by the inversion encapsulates the coupling or correlations between these properties which is demanded by consistency with the seismic data and the prior model.

The imaged traces are typically spaced anywhere from 15 m to 200 m apart, in a regular array, and the inversion does not model the coupling that may occur between model parameters at different traces, chiefly in order to make the inversion problem tractable (a more detailed discussion of these issues can be found in Gunning and Glinsky (2004)). Very strong lateral correlations are induced in the mean (or most-likely) posterior models by the prior and seismic data, but the overall distribution describing the model fluctuations formed by a naive resampling from the Delivery outputs is a product of trace-local distributions, and thus contains no lateral correlation. A necessary and strong qualification to this statement is that any spatial interpolations of the Delivery outputs will necessarily induce correlations via the interpolation algorithms, and indeed we often recommend running the inversion on relatively coarse spacings and using interpolation to smooth; this has the merit of reducing the inversion run-time considerably.

Geologists are accustomed to thinking of transverse correlations in terms of 'characteristic' body sizes and depositional directions. Large scale body shapes will usually be explicitly visible in the seismic, and thus will propagate into the mean posterior models. The residual fluctuations about these means, for many environments, are most simply characterised by two-point statistics and a distance metric which reflects depositional directions, a construct which is familiar to geologists as the conventional semivariogram. Continuity of surfaces is broken at fault locations, though many internal properties may be preserved across the fault, and such geological constraints are preferably also used. Faulting is usually modelled explicitly in reservoir modelling packages like PETREL, and these faults will be embedded in the cornerpoint grids we use as the receptacle for the massaging process. Additionally, hard data for various properties will be available at well locations that have been logged, and is also used in one embodiment of the invention.

It is clear that the combined spatio-multi-property posterior distribution we are able to build, having neglected inter-trace correlations in the inversion, will be a constructed entity. The overall dimensions of the problem, for a large model, will be $10^6$ parameters or more, so perhaps the only computationally feasible way to proceed is to merge the first and second order statistics from the inversion with the second-order statistics implicit in the variograms in a pseudo-Gaussian framework. In terms of second order statistics, it is natural to think of the correlation matrix of the overall structure as a block matrix, with the inversion ensemble furnishing the blocks for the inter-property correlations at each location, and the spatial variogram defining how off-diagonal blocks are coupled. The overall correlation matrix is then a direct (or Kronecker) product of correlation matrices, and the natural and efficient approximation to sampling from the Gaussian distribution attached to this correlation is a generalised p-field algorithm. The great advantage of this preferred approach is that it is only necessary to form approximations to the first and second order statistics (mean and covariance), and then simulation is direct.

Some approximations are required in forming the statistics from the seismic inversion ensemble. All of the quantities of interest are non-negative, and will be approximately Gaussian if the forward seismic model is reasonably linear over the support of the prior (e.g. the thickness of a reservoir layer that is well above seismic resolution). But there are regions were approximate linearity does not hold, and model parameters are also often truncated at one end, so their posterior univariate distribution is a mixture of a spike at the truncation and a continuous tail (see especially the first, 'simple wedge', example in the description below, and FIG. 4). The median value is then a much better statistic for defining a most-likely model, since the mean of a skewed or truncated distribution is less likely than the median. Especially in the case of thicknesses, use of the mean statistic can often generate thin layers (sub seismic-resolution) over extensive areas of space. Obviously the multi-Gaussian model is a heavy approximation in this regime, so the means in the distribution have to be adjusted in this way to eliminate the worst biases. Output samples drawn from the 'massaged' distribution are obviously truncated in the same fashion. Some further interesting aspects of the thin-layers problem are discussed in Appendix 3.

Figure 12:
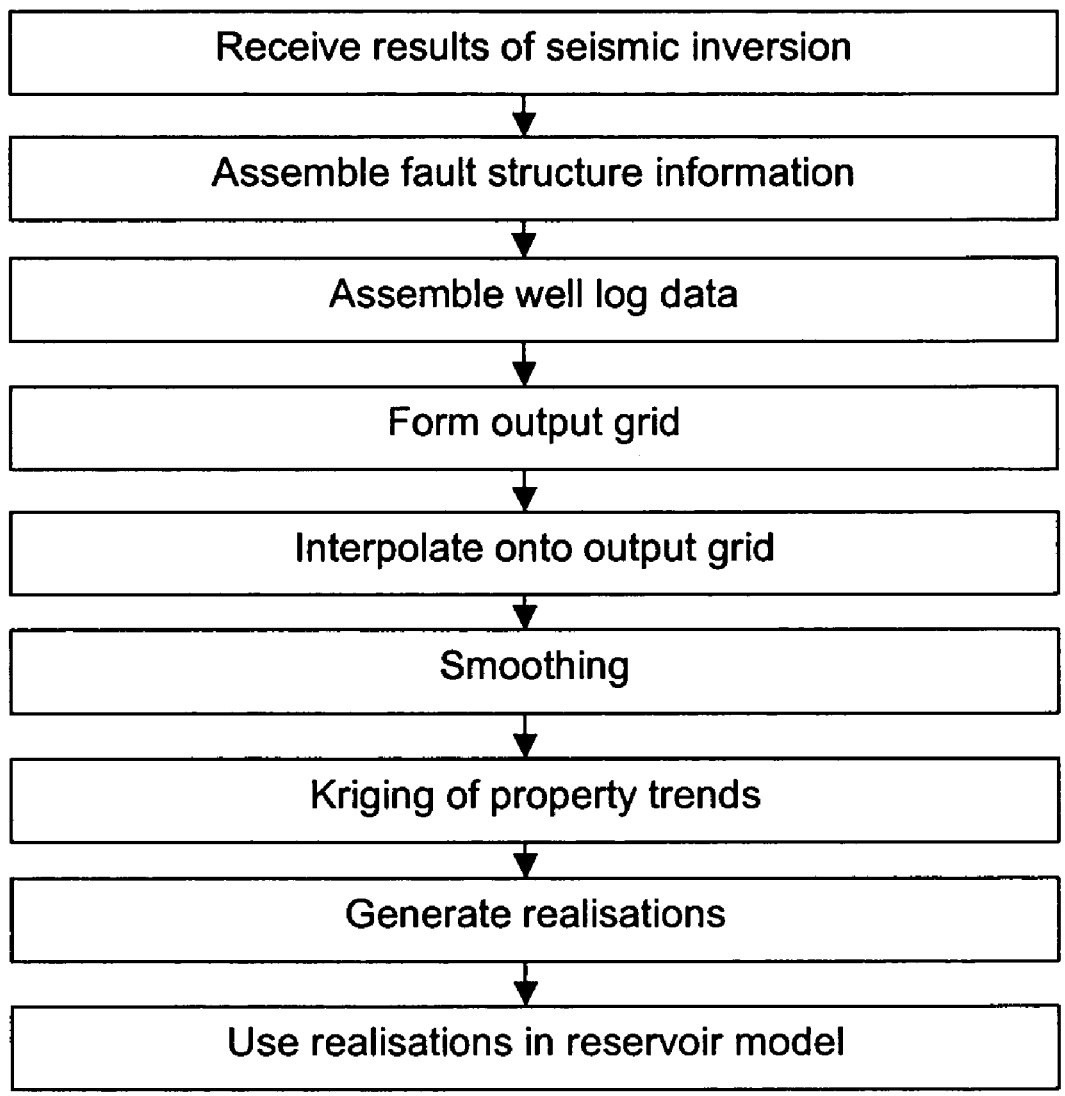
FIG. 12 is a flow chart illustrating the method of a preferred embodiment of the invention.

The main steps in the method according to one embodiment of the invention are set out in the flowchart of FIG. 12. In a first step, the results of a stochastic seismic inversion are received, for example from the known Delivery inversion tool. The results provide output ensembles in respect of a plurality of properties on the basis of imaged seismic data obtained at points on an imaged seismic input grid over a region to be modelled, the output ensembles including information regarding the values of the plurality of properties at points on the input grid for a sequence of model layers, including means and covariances for the properties. In the next step, information regarding an observed fault structure in the region is received, which may be estimated by a geologist. Measured well log data is then assembled in respect of one or more properties, obtained from well locations within the region. It should be noted that these three steps may be carried out in any order.

In the next step, the geometry of the input grid is modified, based on the observed fault structure, to form an output grid for each layer, onto which the property information will be mapped. The values of the properties are then interpolated from the points on the input grid onto the output grid, following which the means and covariances of the output ensembles are spatially smoothed to produce a smooth trend map for each property and a smooth inter-property trend covariance.

A kriging adjustment of the property trends is then performed on the basis of the well log data, so that the trends pass through the well log data. A set of geological constraints may also be applied, including continuity requirements in respect of one or more properties between layers and/or across faults, in order to truncate or otherwise constrain some of the property values at given points. For example, certain properties will be continuous across faults, and others will not.

A set of spatially correlated random fields is then simulated on the output grid for each property, preferably using a p-field technique, and used together with the smooth inter-property trend covariance and the property trend maps to generate a set of realisations for each property which honour inter-property and inter-layer correlations from the seismic inversion, measured well data and, where used, the set of geological constraints.

The generated realisations may then be used in a reservoir model to conduct flow simulation and/or volumetric calculations in respect of the region, including the estimation of uncertainty in flow calculations.

The gridding considerations in processing seismic data will now be discussed.

In accordance with one embodiment of the invention, the geometry of the input grid is modified to form an output grid for each layer, based on an observed fault structure.

The input-grid formed by the x, y locations of the sequence of seismic traces is usually regularly sampled transversely, but the inversion region may have been confined to some polygon of interest. This grid may or may not strictly contain the extremity of the desired output grid. FIG. 1.(*a*) shows a typical layout of an input-grid trace array for seismic inversion, with regular spaced points in a polygon. FIG. 1(*b*) shows a typical output grid for some layer, derived from ECLIPSE-style corner point grids with replication of grid points at fault planes. Different symbols identify segments or fault blocks.

Typically from the inversion, we have available the distribution of (among others) layer-thickness, $N_G$, layer-top depth, and net-hydrocarbon for the sequence of model layers at each trace x, y location.

Conversely, reservoir geological models are usually built with uneven spatial sampling, and often with less transverse resolution than that available in the seismic inversion. Various kinds of grid geometry are possible (Deutsch, 2002), but the present embodiment of the invention preferably uses the widely used cornerpoint grid format for exporting inversion information to reservoir modelling packages. These grids are used by the ECLIPSE reservoir simulator, so we use the adjectives 'cornerpoint' and 'Eclipse' as loosely interchangeable.

Figure 2:
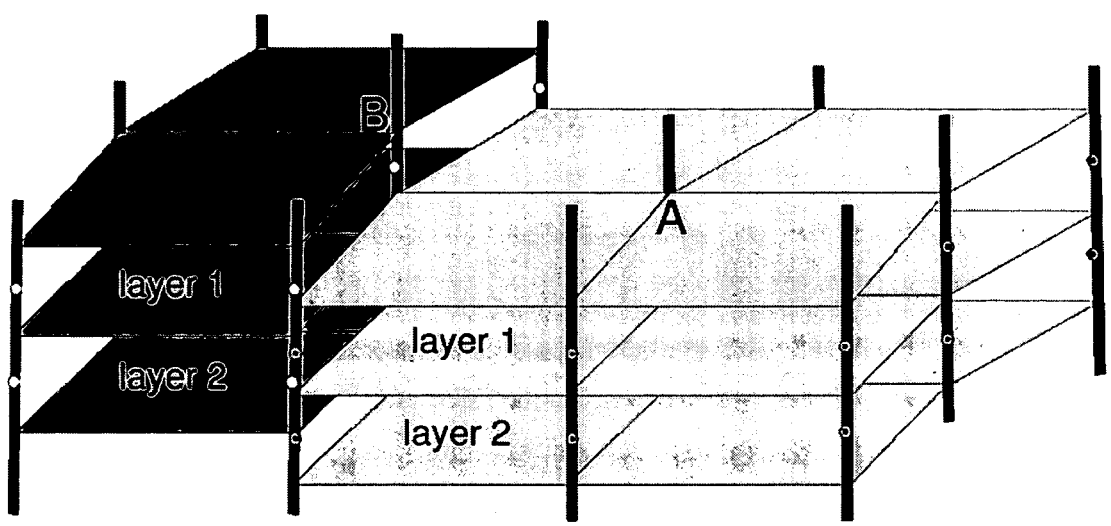
FIG. 2 illustrates the architecture of cornerpoint grids.

FIG. 2. illustrates the architecture of corner point, grids. A typical normal fault is shown. Each layer's output grid is formed from the x, y projections of the edge midpoints (shown as little circles). Thickness and depth information can be shared by blocks that meet at a common points (A), but this information must be duplicated or triplicated at corners along the fault plane (B).

Cornerpoint grids specify lines for the 'vertical' corners of each column of gridblocks, and a set of 8 depth (z) points which define the top and bottom face of any particular gridblock. (The faces are not strictly planar, but flow calculations make suitable projections so as to conserve mass and represent flux correctly). Blocks are indexed by an i, j, k triple, and usually many blocks are tagged as 'inactive' if they represent an uninteresting region of space. The file formats consist of chunks denoting the grid size, local origin, block-corner lines (COORD), corner-depths (ZCORN), and block-centred properties, such as 'active' flags, and segment labels.

In a preferred embodiment, for the massaging calculation, we form, for each layer, a 2d output grid comprising the (x, y) projections of the midpoints of the edges of each corner point block (see little circles in FIG. 2). Each such point has an associated 'segment' or 'fault-block' tag, and points along the fault plane are repeated according to the number of intersecting segments.

A typical plan view of the cornerpoint geometry is shown in FIG. 1(b). Preferably, as in the algorithms described below, all properties are interpolated or simulated at the vertical center of the quasivertical block edges (i.e., the x-y corners). Block centred properties like porosity may be formed later by suitable 4-corner averages.

The smoothing and geostatistical simulation, including notation and requisite algorithms, will now be described.

The overall simulation process is perhaps easier to describe in words than mathematically Roughly speaking, in accordance with a preferred embodiment, the means and covariances of the multi-property Delivery output ensembles (or other inversion results) are spatially smoothed to produce a smooth, trend map for each property and a smooth between-properties trend covariance. The trend map may be allowed to have discontinuities at faults for certain properties. The property trends are then deformed by a kriging adjustment from well observations to produce a trend that passes through all hard observations. The estimation-variance maps produced in the kriging calculation are normalised and stored for each property, for later use. The maps may be truncated or clipped depending on consistency requirements for the properties (e.g. net-sand will be clipped to less than thickness). The trend maps then constitute the most-likely maps of properties. The uncertainty maps are defined by the diagonal entries of the smooth trend covariance multiplied by the kriging variance maps. The square root of the latter map is then a local 'standard deviation' for each property, which honours the inversion uncertainties and the well data.

To generate realisations, a set of normalised, spatially correlated random fields (preferably p-fields) are simulated for each property and layer. At each spatial location these fields are then preferably mixed in a linear combination described by the Cholesky factor of the smoothed between-properties trend covariance. The final set of fields may then be scaled by the normalised kriging-variance maps and added to the trend maps to produce a series of realisations.

The method will be described below with reference to execution as a computer program. The actual program execution follows the initialisation and realisation generating steps set out below reasonably literally, but some notation will first be described.

In general there exists a seismic grid on which the inversion is run, which we call the input grid ($G_I$). The properties are to be generated on a different grid, called the output grid ($G_O$). This is treated as a sequence of 2D grids for each layer, $G_{O,l}$. The index l pertains to layers, p to properties, j to nodes on $G_I$ or a particular $G_{O,l}$ (as arranged in convenient ordering—say a raster scan). The set of hard well observations (O) may be suffixed l or p with implied constraint to layer l or property p. A vector m of properties of interest may be suffixed $m_{(l,p)}$, which denotes a generic unrolled index of property p on layer l. Segment labels for node j are denoted $S_j$.

The local neighbours of node j are denoted by j'~j, or j'∈∂j. Neighbours are defined by a Euclidean distance metric confined to the same layer, with azimuth angle and principal ranges inherited from a conventional variogram specified by the user. Neighbours used in the trend smoothing are defined by the trend-smoothing variogram, whereas observation-kriging and simulations are associated with a separate, layer-specific 'interpolation' variogram. Since the grids are large and irregular in general, a kd-tree algorithm is preferably used for efficient nearest neighbour searching (Skiena, 1997). Nearest neighbour searches in the sequential simulation algorithms must be confined to previously visited nodes, and this may be achieved by a naive dynamic kd-tree implementation.

Initialisation steps will now be described in accordance with the preferred embodiment.

Re-Ordering of Properties

Internally, the property vectors are re-ordered to the following sequence: {depth, thickness, net-sand, other properties}, if all the italicised properties are available. This enables truncation rules to be sensibly applied from known quantities later in the calculation.

Input Grid Segmentation

Fault-sensitive smoothing of the Delivery statistics requires a segment label to be attached to each input grid point. In corner point style grids, segments labels are associated with block centers. The input grid can then naturally inherit the segment label associated with the corner-point grid block in which it falls, as computed for the user-specified reference layer.

Kriging

In accordance with one embodiment of the invention, a kriging adjustment of the property trends is performed on the basis of the well log data so that the trends pass through the well log data.

Kriging is preferably used for both integrating well observations and interpolating from the input to the output grid. Interpolation kriging calculations are performed with a fixed number of nearest neighbours, typically 8, For well observation kriging, all hard-data values are used, and for the sequential simulation routine described later, around 25 neighbours are used. Because the output grid may contain duplicated points, some rank-deficient kriging systems can arise. Robust solution of these is performed using a adaptation of the Schnabel-Eskow modified Cholesky decomposition (Schnabel and Eskow, 1999).

Well Observations

For each layer l, for the observation q at location $r_q$, we construct and solve the ordinary kriging (OK) system for $\{\omega_{j'},\gamma\}$, $$\sum_{j'' \in \partial q} C(r_{j'}, r_{j''})\omega_{j''} + \gamma = C(r_{j'}, r_q), \ j' \in \partial q \subset G_O \quad (1)$$

$$\sum_{j'' \in \partial q} \omega_{j''} = 1$$

where the covariance used is that proper to interpolation for the layer, with unitised sill. We store a data structure for the kriging weights and neighbours, viz. $\{\omega_{(l,q),j'}^{(O)}, j' \in \partial j \subset G_O\}$.

Grid Interpolation

In accordance with one embodiment of the invention, the values of the plurality of properties are interpolated from the points on the input grid onto the output grid.

For each layer l, at the output grid location $j \in G_O$, we preferably construct and solve the OK system for interpolation from the input grid to the output grid $$\sum_{j''\in\partial q} C(r_{j'}, r_{j''})\omega_{j''} + \gamma = C(r_{j'}, r_j),\ j' \in \partial q \subset G_I \quad (2)$$

$$\sum_{j''\in\partial q} \omega_{j''} = 1$$

using, again, the interpolation covariance with unit sill. We save a data structure for the kriging weights and neighbours $$\{\omega^{(G_I)}_{(l,j);j'},\ j' \in \partial j \subset G_I\}.$$

Smoothing

In accordance with one embodiment of the invention, the means and covariances of the output ensembles are spatially smoothed to produce a smooth trend map for each property and a smooth inter-property trend covariance.

If $$\overline{m}^{(G_I)}_{l,p,j}$$

is the p50 statistic from the Delivery inversion for property p, layer l, location $j\in G_I$, we preferably smooth this onto the output grid using a moving average filter whose weights are based on the covariance $C_{sm}(\ )$ specified by the trend-smoothing variogram. Specifically, $$\overline{m}^{(G_O)}_{l,p,j} = \frac{1}{N} \sum_{j' \sim j} W_{l,p,j'} \overline{m}^{(G_I)}_{l,p,j'} \quad (3)$$

where the weights W are defined by $$W_{l,p,j'} = C_{sm}(r_{l,j'}, r_{l,j}) \times \begin{cases} 1 & p \text{ continuous across faults} \\ \delta(S_{j'} = S_j) & \text{otherwise} \end{cases} \quad (4)$$

and the normalisation constant $N=\Sigma_{j'\sim j} W_{l,p,j'}$. A larger number of nearest neighbours are preferably used here, typically 50 or so.

For the covariances, the full covariance matrix (coupling all layers and properties) is preferably provided by the inversion, and is preferably smoothed back onto the input grid (for reasons which will become apparent later), without regard to segmentation. The segmentation is ignored, as uncertainties can be expected to be continuous across faults. In accord with the usual rules for the sum of independent random processes (and also, conveniently, to ensure positive definiteness), the smoothed covariance is $$\overline{C}^{(G_I)}_{l,p,l',p',j} = \frac{1}{N'} \sum_{j' \sim j} W^2_{l,p,j'} C^{(G_I)}_{l,p,l',p',j'} \quad (5)$$

here, $$C^{(G_I)}_{l,p,l',p',j}$$

is the Delivery covariance statistic for property p, layer l with property p', layer l', evaluated at location $j\in G_I$. The normalisation constant N' is the sum of the weights $$W^2_{l,p,j'}.$$

It is also useful to interpolate, for later use, the smoothed trend surface at the well observation points.

$$\overline{m}^{(O)}_{l,p,q} = \frac{1}{N} \sum_{j' \sim q} \omega^{(O)}_{(l,q);j'} \overline{m}^{(G_O)}_{l,p,j'} \quad (6)$$

FFT based methods for smoothing are awkward to use for this problem, on account of the segmentation and the irregular grid.

Trend Adjustment from well Observations

A final initialisation calculation is the adjustment of the trend surface preferably via simple kriging (SK) so it passes through the well data. Preferably, for each layer and property, at each location $j\in G_O$ we compute the residual trend adjustment $$\Delta\overline{m}_{l,p,j} = \sum_{q\in O_{l,p}} \omega_q \left( m^{(O)}_{l,p,q} - \overline{m}^{(O)}_{l,p,q} \right) \quad j \in G_O \quad (7)$$

where $$m^{(O)}_{l,p,q}$$

is the qth observation of property p on layer l. The simple kriging weights $\omega_q$ are the solution of the set of equations $$\sum_{q'\in O_{l,p}} C(r_q, r_{q'})\omega_{q'} = C(r_q, r_j),\ q \in O_{l,p},\ j \in G_O. \quad (8)$$

Again, the covariance used in this SK step is normalised to unit sill. The new trend surface is then defined to be $$\overline{m}'_{l,p,j} = \overline{m}_{l,p,j} + \Delta\overline{m}_{l,p,j} \quad j \in G_O \quad (9)$$

We store also the kriging variance $$\sigma^2_{l,p,j} = 1 - \sum_{q\in O_{l,p}} \omega_q C(r_q, r_j) \quad j \in G_O \quad (10)$$

which is used in the subsequent p-field simulation.

A final preferred step in the trend adjustment is application of a set of truncation rules. This may take the form of a set of geological constraints including continuity requirements in respect of one or more properties between layers and/or across faults. The loop over properties p occurs innermost in the calculation, and the internal ordering of properties described earlier enables successive application of these rules: i) net-sand=min(net-sand, thickness), ii) $N_G$=net–sand/thickness, iii) p=max(p,0), iv) if p is normalised, p=min(p, 1).

Generation of realisations will now be described.

In accordance with one embodiment of the invention, a set of spatially correlated random fields is simulated on the output grid for each property, and a set of realisations is generated for each property on the basis of the random fields, the smooth inter-property trend covariance and the property trend maps, which honour inter-property and inter-layer correlations from the seismic inversion and measured well data Realisations are preferably generated using a generalized p-field technique (Deutsch and Journal, 1998), which requires a set of unconditional correlated realisations on the output grid. There are various ways to do this, but the sequential simulation technique is most easily adapted to the unstructured grid.

Some notation and apparatus is necessary. For each layer l, we preferably construct a pseudo-multigrid path $P_l$, which is a visiting sequence for all the nodes in the layer. The sequence is pseudo-multigrid in the sense that the grid nodes are visited in a sequence derived from a breadth-first traversal of a binary tree representation of the nodes. This ensures that widely spaced points are visited early in the path. For the visited node $\hat{j}$, we denote by $\partial\hat{j}$ the nearest neighbouring points of $\hat{j}$ that have already been visited, up to some maximum of $N_n$ neighbours, and with the notion of distance derived from the layer variogram. We will generate and store $\alpha=1 \ldots N_R$ realisations at each grid point during the path traversal.

The conditional distribution for the p-field $\zeta_{l,p,\hat{j},\alpha}$, is $$N(\mu_{l,p,\hat{j},\alpha}, \sigma^2_{l,p,\hat{j}}),$$

where the conditional mean is $$\mu_{l,p,\hat{j},\alpha} = \sum_{\hat{j}' \in \partial \hat{j}} \omega^{(SK)}_{\hat{j}'} \xi_{l,p,\hat{j}',\alpha}, \quad (11)$$

the conditional variance (geometry dependent only) is $$\sigma^2_{l,p,\hat{j}} = 1 - \sum_{\hat{j}' \in \partial \hat{j}} \omega^{(SK)}_{\hat{j}'} C(\hat{j}', \hat{j}), \quad (12)$$

and the simple kriging weights in these last two relations are the solution of the SK system $$\sum_{\hat{j}'' \in \partial \hat{j}} C(r_{\hat{j}'}, r_{\hat{j}''}) \cdot \omega^{(SK)}_{\hat{j}''} = C(r_{\hat{j}'}, r_{\hat{j}}) \quad \hat{j}' \in \partial \hat{j} \subset G_O \quad (13)$$

Again, the variogram is normalised, and the p-fields $\zeta$ have univariate distribution $N(0,1)$. The fields $\zeta_{l,p,\hat{j},\alpha}$ are stored by a fully nested loop on l, $\hat{j}$, p and $\alpha$.

These p-fields are now unconditional correlated fields that contain the necessary spatial correlation on the output grid, but honour neither the inter-property/inter-layer correlations from the seismic inversion nor the hard well data.

To introduce the inter-property/layer correlations, a local interpolated covariance may be computed at each node $j \in G_{O,l}$ (in a conventional loop over the output grid l) as $$\overline{C}^{(G_O,l)}_{l,p,l',p',j} = \frac{1}{N} \sum_{j \in \partial j} (\omega^{(G_l)}_{l,j,j'})^2 \overline{C}^{(G_l)}_{l,p,l',p',j'} \quad j' \in \partial j' \subset G_l \quad (14)$$

using the saved OK/interpolation weights from equation (2). The normalisation N is again defined as the sum of the squared OK/interpolation weights: squaring is used again to ensure positive definiteness. Define by $$\overline{L}^{(G_O,l)}_j$$

the conventional (left) Cholesky factor of $$\left\{ \overline{C}^{(G_O,l)}_{l,p,l',p',j} \right\}$$

where we unroll the indices l,p in the usual way. Define also the diagonal scaling matrix $$S^{(WO)}_j = diag\{\sigma_{l,p,j}\}$$

using equation (10), with the same indexing. Realisations may then be computed on the fly by 'mixing' the correlated p-fields and adding back the trend:

$$m^{(R)}_{l,p,j,\alpha} = S^{(WO)}_{l,p,j} \cdot \sum_{l',p'} \overline{L}^{(G_O,l)}_{l,p,l',p',j} \xi_{l'p',j,\alpha} + \overline{m}'_{l,p,j} \quad (15)$$

This is the p-field mixing equation which imposes the inter-property/layer correlations and well constraints on the correlated fields to produce the realisations. A final step preferably consists in the imposing of the property truncation rules on $$m^{(R)}_{l,p,j,\alpha},$$

as per the mean trend calculation.

Under this construction, the covariance of the residuals $$\Delta m_{l,p,j,\alpha}^{(R)},$$

(the first term in equation (15)) can be shown to have these reasonable special cases:

$$\left\langle m_{l,p,j}^{(R)} m_{l',p',j'}^{(R)} \right\rangle = \begin{cases} S_{l,p,j}^{(WO)} S_{l',p',j}^{(WO)} \overline{C}_{l,p,l',p',j}^{(G_0,l)} & \text{Same location, } j = j' \\ S_{l',p',j}^{(WO)} \overline{C}_{l,p,l',p',j}^{(G_0,l)} C(r_j, r'_j) & \text{Smoothed inversion statistics match at } j, j' \end{cases} \quad (16)$$

The downscaling, or 'decoration' algorithms of a particularly preferred embodiment will now be described.

In most realistic applications, fluid flow will be sensitive to the manner in which impermeable material (usually clay: we will use the placeholding name 'shale' hereon) is spatially dispersed within the 'meso-scale' reservoir layers used for the inversion. Capturing this effect will then require subdivision of the vertical gridding and suitable categorical simulation of the shales within a meso-scale layer.

This categorical simulation must be consistent with the net-to-gross $N_G$ obtained from the seismic inversion, or, equivalently, a 'massaged' realisation. The inversion forward model typically uses an effective-medium approximation based on a separation of length scales between the vertical spatial scales characterising the shale distribution and the seismic wavelength. In this regime, the effect of the shale on the seismic response is then captured by an effective macroscopic parameter, the layer net-to-gross ($N_G$), via the Backus average. The preferred model also assumes a laminated distribution of shale, which is a respectable assumption for reservoirs where internal shales are gently dipping.

A variety of categorical simulation techniques are in common use in petroleum geostatistics. Perhaps the best understood algorithms for binary simulation are truncated Gaussian fields (le Loc'h and Gall, 1996), and the inventors have chosen to adapt this method to the 'decoration' problem in a preferred embodiment on account of the efficiency of simulation of the underlying continuous field. Users are expected to furnish a 3D variogram describing the spatial continuity of the underlying Gaussian field, which can be estimated in consultation with a geologist. This variogram is embedded in the (normalised) covariance function $C_{TG}(\ )$. The algorithm we describe is somewhat heuristic, but very efficient, and strikes a good compromise between the connectivity embedded in the variogram and the coarse-scale constraints. It may be loosely described as a greedy, optimising, sequential truncated Gaussian simulation.

Rigorous sampling of high dimensional categorical spatial distributions with tight likelihoods is notoriously difficult (Winkler, 2003). A formulation in terms of discrete Markov Random Fields (MRFs) would have been more satisfactory in terms of incorporating the net-to-gross likelihood constraint, but explicit control of correlation length scales is much more difficult with MRFs. The preferred embodiment of the invention also does not try and provide a 'most-likely' categorical map, since this object is highly (combinatorically) non-unique, and any of the most-likely models is very non-representative. An analogy with the celebrated Ising model of statistical mechanics is helpful (Winkler, 2003), since this represents by far the best understood MRF model in the literature. If we map Ising ±1 spin states to rock categories, the temperature of the Ising model determines the correlation length of the realisations, but at any temperature, the 'most-likely' model is all one category or spin in an unconstrained model. For the case of smooth $N_G$ constraints, the most likely model(s) will be a layered two-zone partitioning, with the zone boundary of minimal length: this will clearly violate the homogenisation assumptions used in the inversion.

A fast approximate method of downscaling the 'massaged' seismic inversion results comprises (a) an initial subgridding to the desired resolution and geometry, followed by (b) a sequential truncated Gaussian simulation for the rock categories which is stochastically optimised to match the net-to-gross ($N_G$) values produced by the seismic inversion. The stochastic optimisation is performed by a greedy selection of the best match from multiple simulations of sets of gridblocks in a column, with the columns of the cornerpoint grid visited in a multigrid sequence to ensure reproduction of the longest length scales of the supplied variogram. The truncated Gaussian threshold is computed from the target $N_G$.

The algorithm preferably runs as follows, conditional on some known realisation of $N_G$ on the coarser grid:

Vertically subdivide the layer l into a more finely meshed grid $G_{OD}$, with whatever style of gridding is appropriate, preserving the lateral spacing. Suppose there are $N_z$ fine gridblocks in a subgrid column.

Form a multigrid traversal path for $G_{OD}$, comprising an outer 2D multigrid path $P_{col}$ for 'column' visiting; and an inner 1D path $P_z$ for visiting gridblocks within the chosen column.

At each column in the outer path, loop over blocks $ĵ \in P_z$ in the column, forming and solving the set of SK equations for each block, conditioned on the nearest known blocks from previously visited columns and previously visited blocks in the current column. The SK systems use the covariance $C_{TG}(\ )$. We store the weights $$\omega_{(\hat{j}),\hat{j}'}^{(SK)}, \hat{j}' \epsilon \hat{j}$$

for all $N_n$ nearest neighbours $ĵ'$ of all blocks $ĵ$ in the column.

From the coarse grid simulation or map of $N_G$ at this column, use the local threshold $y = G^{-1}(N_G)$ to form the truncated Gaussian field, where $G^{-1}(\ )$ is the inverse Normal CDF. If the underlying coarse grid simulation is spatially smooth (expected), the threshold y will be as well.

Form a set of, say, $\alpha' = 1 \ldots 50$ realisations η of the underlying Gaussian field for the current column, by repeatedly running the sequential sampler over the column path, using the pre-stored weights and the conditional cdf's $$N(\mu_{\hat{j},\alpha'}, \sigma_{\hat{j}}^2),$$

with conditional mean $$\mu_{\hat{j},\alpha'} \sum_{\hat{j}' \in \partial \hat{j}} \omega_{\hat{j}'}^{(SK)} \eta_{\hat{j}',\alpha'}, \quad (17)$$

and conditional variance $$\sigma_{\hat{j}}^2 = 1 - \sum_{\hat{j}' \in \partial \hat{j}} \omega_{\hat{j}'}^{(SK)} C(\hat{j}', \hat{j}).$$

This is very fast, requiring only $O(N_z N_n)$ flops per simulation. We greedily accept the simulation whose associated truncated field $$\eta_{\hat{j},\alpha'}^{TG} = H(\eta_{\hat{j},\alpha'} - y)$$

best matches the column $N_G$ (a columnwise sum), and proceed to the next column in the 2D multigrid column path.

The complexity of this algorithm is only a small multiple of the workload of a conventional sequential simulation, typically $O(10^3)$ flops per node.

The Stybarrow field-case example described later illustrates some realisations drawn using this algorithm, especially FIG. 10.

Other methods may be used for the downscaling, or 'decoration', operation. For example, the impermeable portion may be conceived as objects, the dimensions of which are drawn randomly from distributions specified by geoscientists, and the location and dimensions of which are annealed using maximum a posteriori probabilities constructed from the coarse inversion results, and potentially conditional to trends specified from geologic concepts or geophysical surveys.

Alternatively, all downscaled layer thicknesses may be conceived as being drawn from truncated Gaussian processes (possibly nonstationary), and simulated using heirarchical sampling for auxiliary and continuous variables which specify the active layers and the joint downscaled thickness distributions, respectively, at a particular trace. The simulation may proceed by blocks or strictly tracewise in a sequential manner, possibly using Markov Chain Monte Carlo methods. The sequential algorithm samples from the posterior distribution for the sublayer thicknesses, and is dependent on user-supplied variograms, well data, and the accumulating history of the algorithm. Fast approximate alternatives to this algorithm, using deterministic topological distortions of a truncated-Gaussian simulated sub-layer array which optimally match the coarse scale constraints, are also feasible.

The preferred embodiment of the invention may be implemented in software, preferably written in ANSI C, and distributed along with the known open-source *Delivery and WaveletExtractor* codes (Gunning and Glinsky, 2004, 2005; Gunning, 2003). Library dependencies are all open source. It contains an ECLIO library for handling ECLIPSE-style cornerpoint grids, and links to the high performance ATLAS library for the intensive linear algebra work (Whaley et al., 2001). The supplied kd-tree range-search library is based on Ranger from Stonybrook (Skiena, 1997). For large models, the grid smoothing is intensive as well as the sequential simulation, and RAM sizes over 1 Gb may be required.

Compilation instructions are provided in the README file at the top level of the source tree. Installation of the third party ATLAS, glib, and libxml libraries is straightforward on any variety of Unix/Linux, but should also be possible on other architectures with an ANSI compiler. The binaries supplied will be valid for current Intel Linux architectures.

Examples of the use of one embodiment of the invention will now be described.

The first example relates to a simple wedge with Graben-like fault.

This very simple synthetic example has been constructed to illustrate some of the main considerations in constructing a workflow involving the massaging method and software of one embodiment of the invention.

Figure 3:
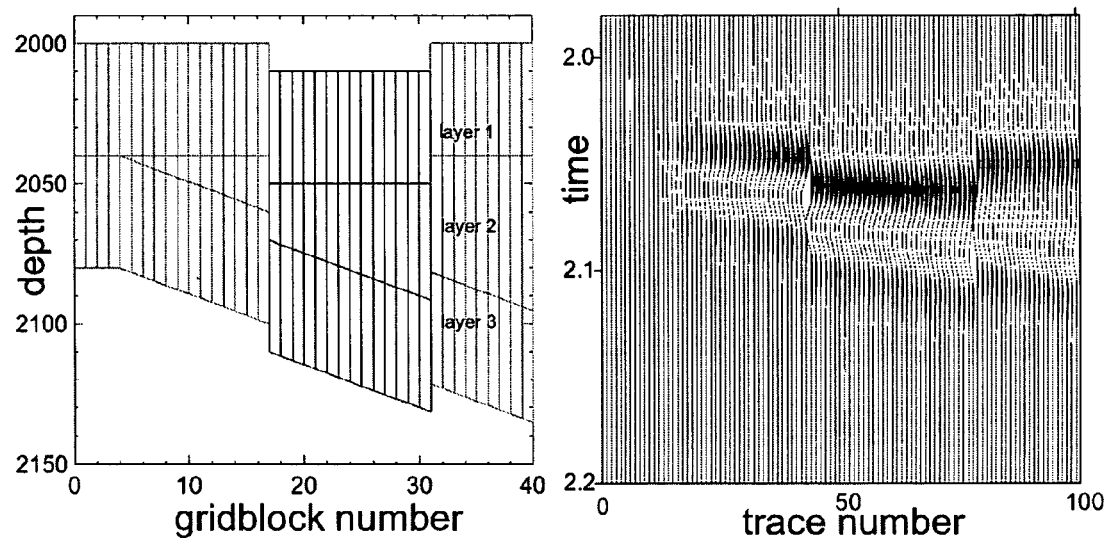
FIG. 3 illustrates the modelling of a fault-block.

This model is constructed as a 2 d case for visualisation simplicity. FIG. 3 shows a 'truth-case' cross-section of the 40×1 cornerpoint grid with seismic.

FIG. 3 is a truth-case faulted 3-layer shale/sand/shale wedge model, with the sand layer of about 70% $N_G$. Fault-block segments (based on seismic 'interpretation' in the corner point grid are shown grayscale coded. The cornerpoint grid is based on a 100×100 m grid, but the seismic is sampled at 40 m spacing, i.e. denser traces than grid blocks, which is a common situation.

It is common to fix a reference depth layer to the strongest reflection—often the top of a reservoir, which is chosen as the top of layer 2. This reference is invisible when the sand pinches out, so is extrapolated horizontally for simplicity. A depth uncertainty of $\sigma_z=5$ m is attached to this surface in the Delivery prior; all other depths are referenced to this and computed from layer velocities and times. After the delivery inversion is run, typically with % delivery -PD -v 3 -RWS -N 100 -m prio_traces.su ModelDescription.xml, the summary file of statistics is generated for use in the massaging step:

% deliveryAnalyser -I realisations.su --massage-analyse ep,cdp,gx,gy \ 1,2,3 d,thickness,net-sand, NG massage_analysis.mab which produces a set of median and covariance statistics for layers 1,2,3 and properties depth, thickness, net-sand, and $N_G$ in the file massage_analysis.mab. The seismic header words ep,cdp,gx,gy are reproduced in the file for spatial locations. This file will be very large for big models, so special binary compression techniques are used.

Figure 4:
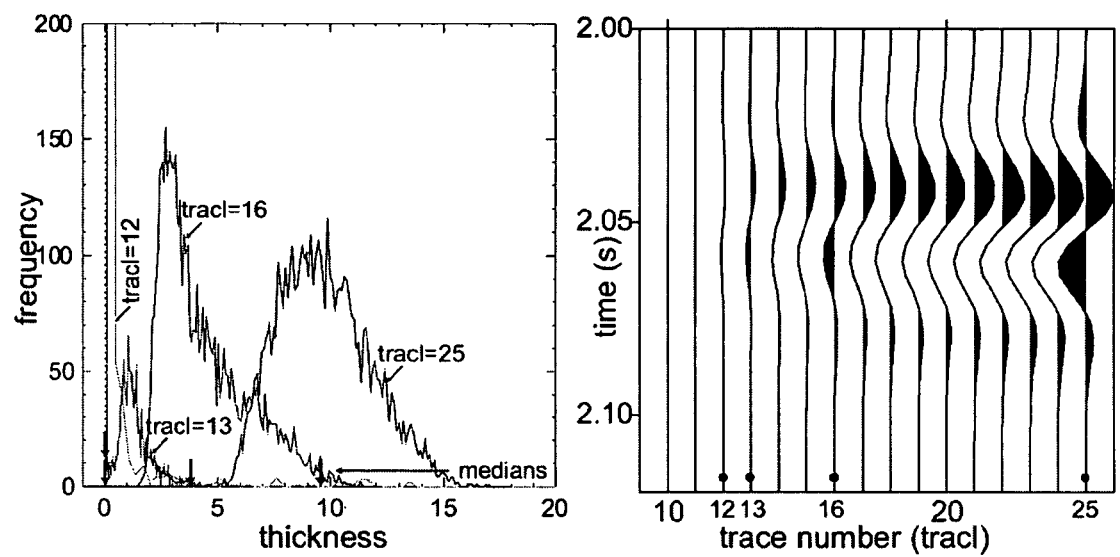
FIG. 4 shows measured values of layer thicknesses.

The detail of what happens with the statistics near the pinchout is interesting. FIG. 4 shows the histogram of the layer-2 thickness computed from exhaustive (5000 realisations) samples at four of the traces where the sand is thin. Note the evolution towards symmetric Gaussian-like distributions as the layer thickens.

The histogram is of the reservoir (layer 2) thickness at the four traces tracl=12,13, 16 and 25 (shown at right). The distribution gradually evolves from a pure spike at thickness=0, through a mixed spike and minor mode (tracl=13), to a nearly Gaussian single mode when the amplitudes improve. The median (50% quantile) statistic used in the analysis to define the most-likely value at each trace is highlighted on the axis.

Producing corner-point style grids is then straightforward. An XML file Massager.xml is created with suitable entries for the required properties, smoothing variograms, residuals' variograms, and hard well data, etc. A typical runtime command is then % deliveryMassager Massager.xml -v 3 -a -N 10 -ecl which would produce 10 realisations of the cornerpoint grid, plus the p50 model, in files with obvious names like MassagedEclPropertiesLayer* and suitable suffixes. See Appendices 1 and 2 for more details.

Figure 5:
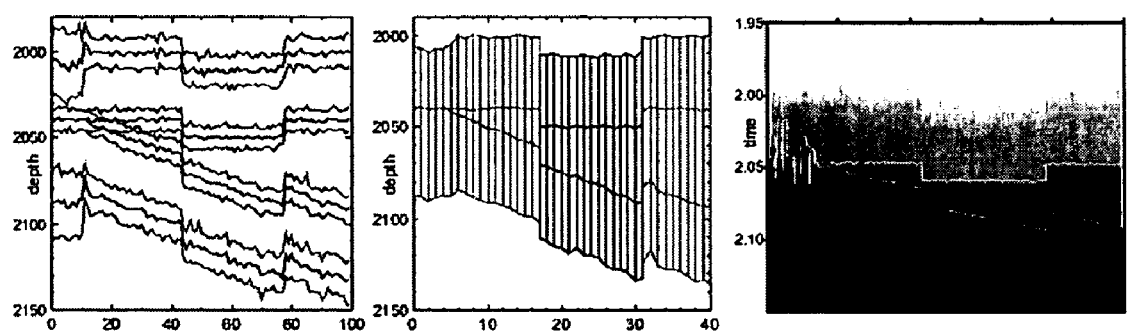
FIG. 5 illustrates depth uncertainties in seismic information.

The layer depths extracted from the p50 statistics at each seismic trace lack spatial continuity for two reasons: 1) noise in the seismic traces feeding the inversion, and 2) sampling error in the MCMC ensemble, which will usually scale like $N^{-1/2}$ if the ensemble has N samples, but may central limit more slowly if the posterior contains many modes and/or the modes have eccentric shapes (like pinchouts, which are 'half-Gaussians'). The example above, with only 100 realisations, can be expected to have substantial sampling noise (in practice, more realisations would be generated to reduce this). FIG. 5 shows what the median model extracted from these samples will look like in both time and depth, and demonstrates the issues involved in forming a cornerpoint model from undersampled inversion with no smoothing. FIG. 5 shows: (a) Layer depth p10, p50, p90 surfaces on seismic grid; (b) Eclipse grid interpolated from seismic with very weak smoothing; (c) Inversion realisations on time scale, with obvious increase in uncertainty in pinchout region. Notice how depth uncertainties increase where the amplitudes disappear, since both event times and reflection coefficients (and therefore velocities) cannot be inverted for.

Figure 6:
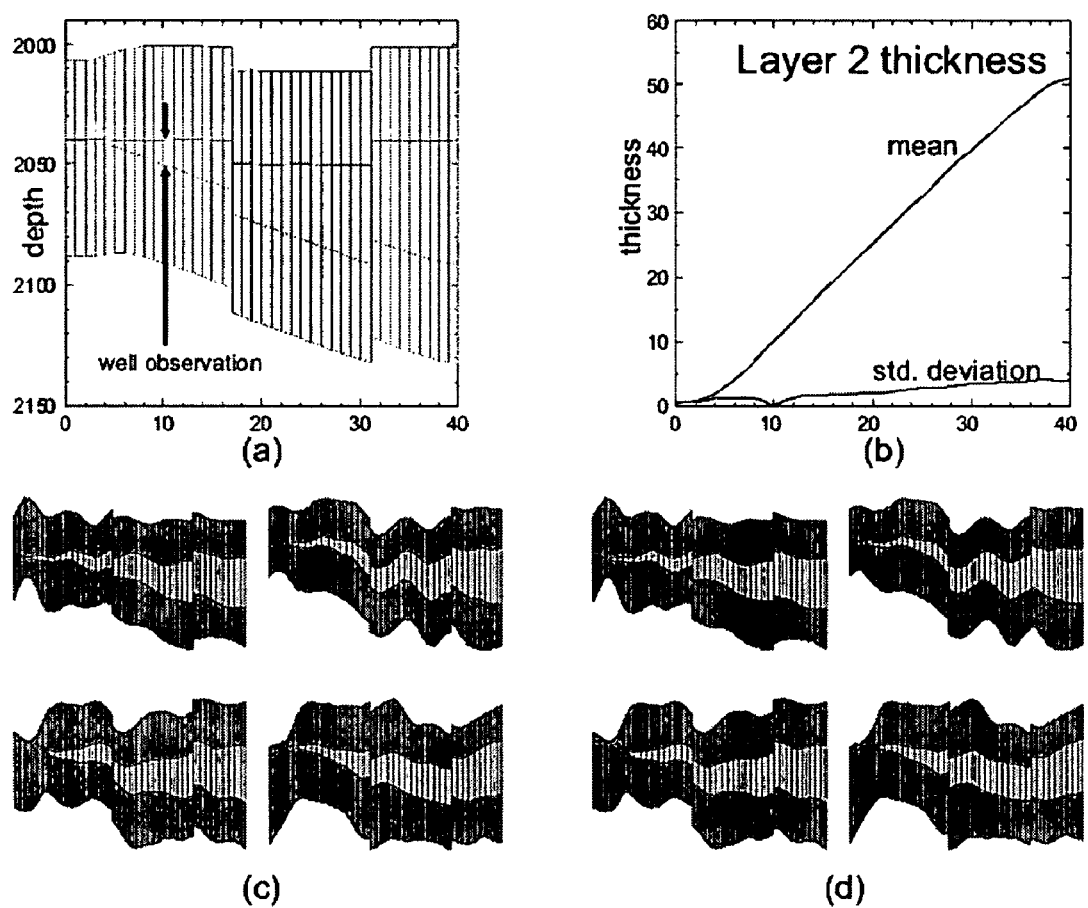
FIG. 6(a) shows a cross-section of a cornerpoint model.
FIG. 6(b) shows the mean thickness and uncertainty in the middle layer.
FIGS. 6(c) and 6(d) show typical realisations.

If we impose smoothing with an isotropic Gaussian variogram of range 600 m, and form a most-likely model and several realisations, the cornerpoint grids look like those depicted in FIG. 6.

FIG. 6 shows: (a) Cross section of most likely smoothed corner point model, with segments grayscale-coded; (b) p50 thickness and thickness uncertainty of middle layer, showing the effect of a single well observation in the 10th gridblock; (c) Four typical model realisations, with $N_G$ grayscale scale between dark (shale) and sand (light)—thickness and net-sand are continuous across faults; (d) Same as (c), but with continuity of layer thicknesses, etc, not enforced across the faults.

The XML property attribute smooth_across_faults controlling continuity across faults have been altered to produce the rather non-geological realisations of FIG. 6(d), for demonstrative purposes.

Figure 7:
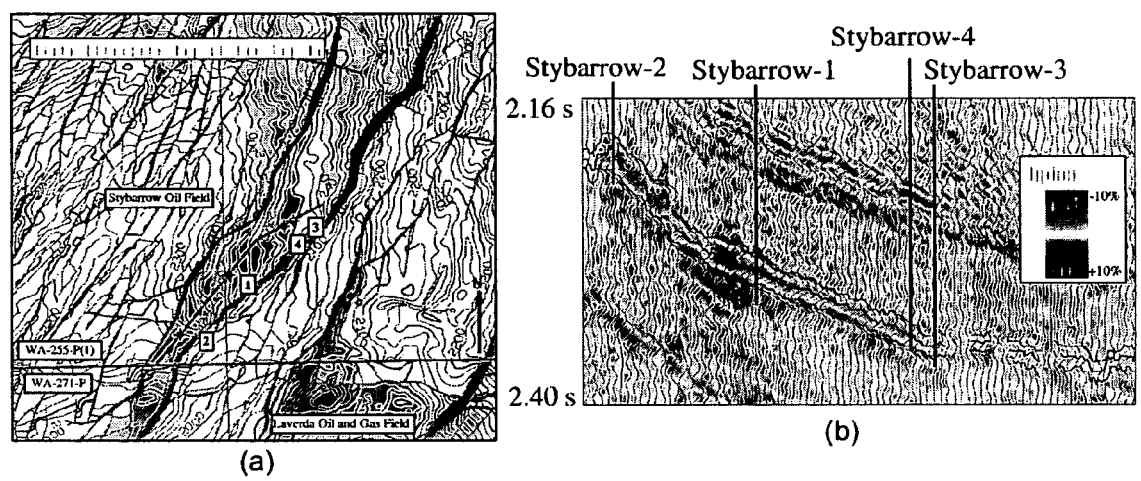
FIGS. 7(a) and 7(b) respectively show plan and elevation views of an example region (the Stybarrow Field)

The second example relates to the Stybarrow field off Western Australia, which has been subjected to the full gamut of Delivery style workflow. A more comprehensive overview is given in Glinsky et al. (2005). The field is an early Cretaceous turbidite sandstone, whose structure comprises a narrow, wedge-like NE-to-SW tilted fault block, with normal faults providing closure to the SW. Cross-section and elevation views are in FIG. 7, with the elevation in the down-dip direction along the line passing through the four wells.

Four wells were used for simultaneous wavelet extraction, using the software of Gunning and Glinsky (2005). The coarse layer-based model constructed for Delivery inversion comprised 6 layers in the sequence shale/thin-sand/thin-shale/main-sand/hard-shale/shale. The seismic inversion was run only on traces within the fault block/hydrocarbon trap region. The asset geological team built an ECLIPSE model of the reservoir using the same layering, identifying about a dozen internal faults and associated segments.

Figure 8:
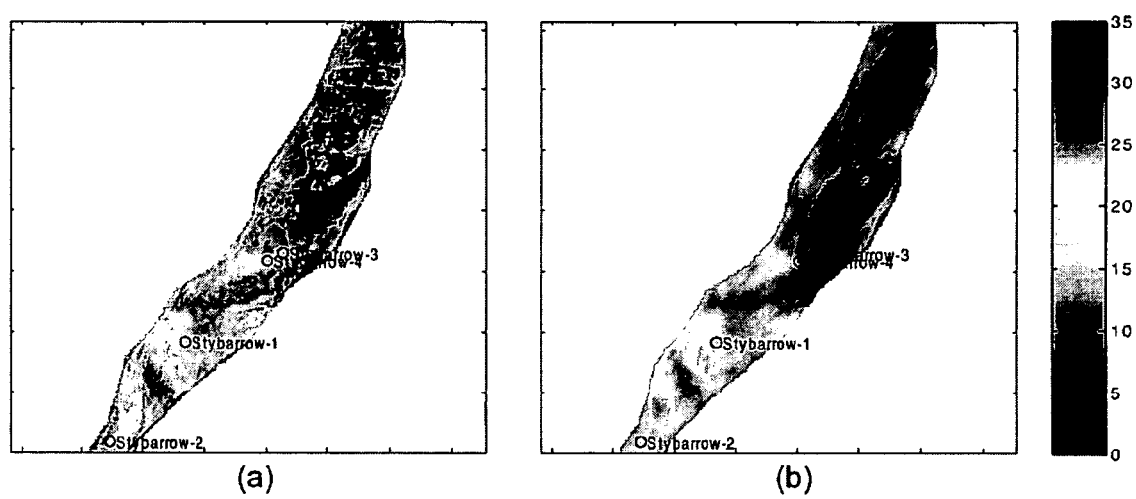
FIGS. 8(a) and (b) show median maps of net-sand for the Stybarrow Field, directly from a seismic inversion and after processing in accordance with one embodiment of the invention, respectively.

Since one of the wells (Stybarrow 4) penetrated the lower fluid contact, the uncertainty of chief interest was that of the net-sand volume within closure above the known contact. FIG. 8 shows grayscale maps of the p50 net-sand of the main sand, with obvious short-scale transverse noise caused by sampling error and various other sources of noise. FIG. 8(a) shows the map directly from Delivery inversion, and FIG. 8(b) shows the map after massaging with long-scale smoothing variograms in accordance with a preferred embodiment of the invention. The map smooths across segments since the faulting is treated as normal.

The asset geologist suggested transverse correlation lengths in the km range for the main bodies in this field, and the smoothing effect of this on the p50 'massaged' map is evident in FIG. 8.b.

The uncertainties in the main sand net-sand volume is strongly influenced by the correlation lengths of the allowable body fluctuations, as the extent to which the stochastic volumes will central-limit (within the fault-block integration area) to a sharply defined average is strongly controlled by these lengths. The distribution of this volume was estimated by drawing an ensemble of realisations of net-sand, conditioned on well data, and integrating over the maps above the contact level. The code produces ascii files with summary statistics of 200 realisations by using the typical runtime command:

% deliveryMassager StybarrowMassager.xml -v 4-a —N 200-stats

Figure 9:
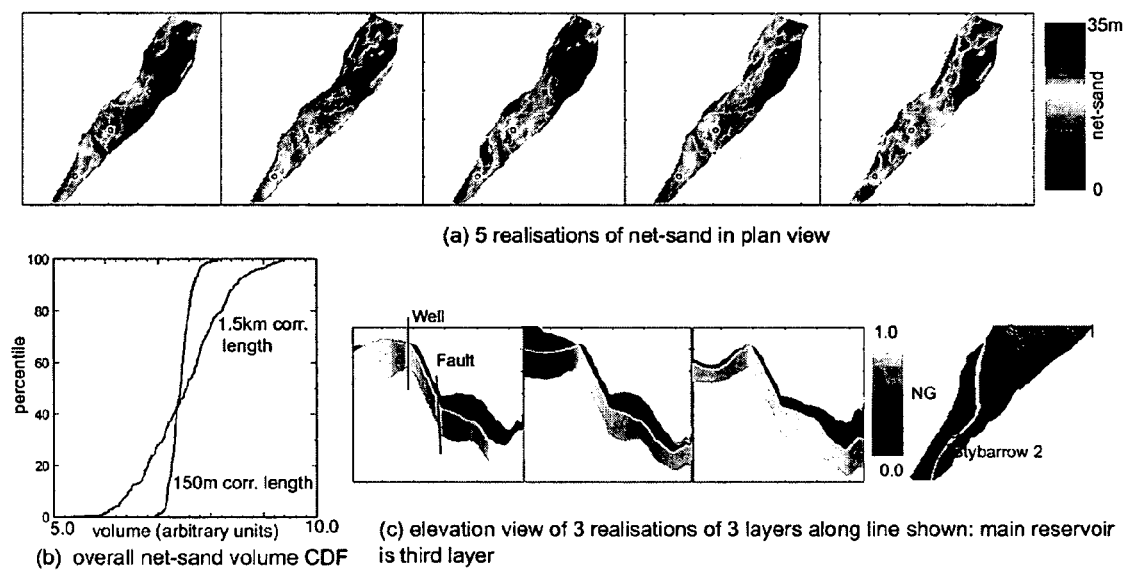
FIG. 9(a) shows realisations of the main sand net-sand map for the Stybarrow Field in plan view.
FIG. 9(b) shows the volumetric CDF.
FIG. 9(c) shows elevation views.

FIG. 9 shows typical realisations of the reservoir main sand body generated in this way, conditional on the well data and the seismic inversion constraints, (a) in plan view, and (c) in elevation. The inset FIG. 9(b) shows the CDF of the net-sand volume computed from these realisations, with arbitrary units, with the effect of shortening the transverse correlation lengths demonstrated with a second curve. Correlation lengths used in the actual model were on the km scale, leading to much greater volumetric uncertainty than that obtained with short correlation scales. With the shorter fluctuation lengths, the overall integrated volume is naturally less uncertain, with a sharper rise in the CDF. The variogram structures do not affect the median volumetric statistics, as expected, since this is only a function of the smoothing algorithm.

Figure 10:
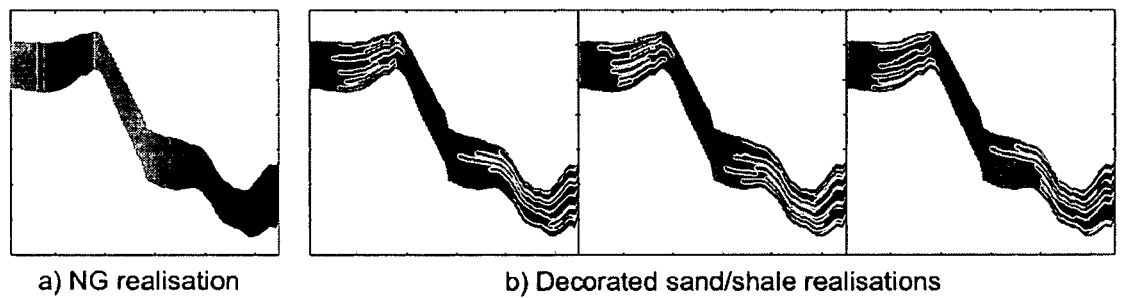
FIG. 10 shows typical 'decorated' layer images in accordance with a preferred embodiment.

As an example of the 'decoration' algorithm, FIG. 10 shows typical 'decorated' layer images generated using the preferred 'decoration' algorithms described above, along the same transect shown in FIG. 9(c), where the net-to-gross is quite high. The code produces a user-specified number of decorations for each NG realisation of the coarser layer. In this case, the sub-gridding uses proportional gridding, with variogram distances measured in the proportional sense within the layer.

The method and deliveryMassager computer program according to one embodiment of the invention is an essential tool for coercing the stochastic seismic outputs from a stochastic seismic inversion, such as the Delivery seismic inversion tool to formats suitable for flow simulation or further 3D modelling and analysis. It performs a merging of expert-prescribed lateral correlations with the vertical correlations inferred in the inversion, which is essential for the generation of both realistic most-likely-case models and for uncertainty studies using stochastic realisations. Hard observations, faulting information, and segmentation requirement are honoured. The preferred embodiment of the invention generates industry-standard cornerpoint grid formats usable directly by common 3D modelling tools and flow simulators.

References have been made in the foregoing description to the known Delivery software, although the preferred embodiment of the invention may use seismic inversion data of any other suitable form.

The above describes a particular preferred embodiment of the invention. However, modifications may be made within the scope of the claims. In particular, the different steps of the method set out in claim 1 may be implemented in the particular ways set out in the description above, or in equivalent ways, and it should particularly be noted that the specifically described method of any given step may be carried out in combination with implementations of other steps with are different to the specific examples given. Furthermore, the several of the method steps set out in the claims may be merged and carried out at the same time.

REFERENCES

Besag, J., 1986. On the Statistical Analysis of Dirty Pictures. Journal of the Royal Statistical Society, Series B 48 (3), 259-302.

Deutsch, C. V., 2002. Geostatistical Reservoir Modelling. Oxford University Press.

Deutsch, C. V., Journal, A., 1998. GSLIB Geostatistical Software Library and User's Guide, 2nd edition. Oxford University Press.

Glinsky, M. E., et al., 2005. Integration of Uncertain Subsurface Information into Multiple Reservoir Simulation Models. The Leading Edge 24, 990-999.

Greig, D., Porteous, B., Seheult., A., 1989. Exact maximum a posteriori estimation for binary images. Journal of the Royal Statistical Society, Series B 51(2), 271-279.

Gunning, J., 2003. Delivery website: follow links from http://www.petroleum.cairo.au.

Gunning, J., Glinsky, M., 2004. Delivery: an open-source model-based Bayesian seismic inversion program. Computers and Geosciences 30 (6), 619-636.

Gunning, J., Glinsky M., 2005. WaveletExtractor: A Bayesian well-tie and wavelet extraction program, submitted to Computers and Geosciences.

le Loc'h, C., Galli, A., 1996. Truncated plurigaussian method: theoretical and practical points of view, In: Baafi, E., Schofield, N. (Eds.), Geostatistics Wollongong '96. Vol. 1. Kluwer, Dordrecht, pp. 211-222.

Schnabel, R. B., Eskow, B., 1999. A revised modified Cholesky factorization algorithm. SIAM Journal on Optimization 9 (4), 1135-1148.

Skiena, 5., 1997. The Algorithm Design Manual. Springer, N.Y., online software at http://www.cs.sunysb.edu/algorith.

Thompson, C., 1972: Mathematical Statistical Mechanics. Princeton University Press, New Jersey.

Whaley, R. C, Petitet, A., Dongarra, J. 0.1., 2001. Automated empirical optimizations of software and the ATLAS project. Parallel Computing 27 (1-2), 3-35, See the netlib repository: www.netlib.org/atlas.

Winkler, G., 2003. Image Analysis, Random Fields and Markov Chain Monte Carlo Methods: A Mathematical Introduction. Springer.

Appendices

Appendix 1: Input files

When running the deliveryMassager code, very frequently changed runtime options are reserved for the commandline: the executable deliveryMassaqer self-documents if no arguments are supplied, for those wishing to peruse these options. Otherwise, all input parameters are specified in an XML file (see 1.1 below), but this will in turn reference other files that may be required:

A mandatory summary file of the inversion statistics, which contains trace locations and median and covariance statistics for each of the inversion quantities of interest in all the salient layers. Once the inversion is run, with the realisations in the file (say) realisations.su, this summary statistics file is generated using % deliveryAnalyser -I realisations.su --massage-analyse \
headerwords layer-numbers properties outputfile Here, each of headerwords/layer-numbers/properties is a comma separated list, as per the examples.

If (optional) output grids in ECLIPSE style corner point grids are required, a 'receptacle' corner point grid must be supplied, which has the same layering as the inversion model. The critical information gleaned from this file is the geometry and fault blocking, so the fields PINCH, MAPAXES, GRIDUNIT, SPECGRID, COORDSYS, COORD, ZCORN, ACTNUM, and SEGMENTS will be required. (SEGMENTS may be skipped, with the consequence that all blocks are assumed to be in the same segment). These fields are routinely supplied in the ECLIPSE files exported from commercial modelling packages like PETREL. Readers are referred to ECLIPSE documentation for further detail on. these file formats.

If no corner point grid is supplied, the massaging code can produce most-likely maps and realisation files on the same grid as the seismic inversion ('duplicate' mode), which is often very useful. No fault block information is available when using this mode.

1.1 XML formats and Schema

The XML format used to control the massaging process has a meta-description in the associated Massager.xsd XML schema file, which can be used in the XML editor supplied with the Delivery distribution to produce strictly legal XML files. The format of the XML is largely self-explanatory, but a few explanations may be helpful.

<delivery_massage_analysis_filename> tags the median and covariance statistics file formed from the inversion analysis step (section 1).

<x-coordinate_header_word> and <y-coordinate_header_word> define the seismic header words, passed through in the deliveryAnalyser --massage-analyse process, which set the transverse coordinates in local UTM coordinates. They must correspond to the UTM coordinates used in the input ECLIPSE files. If these seismic header words are not available, local x,y coordinates can be computed from inline/crossline header words (always available) using the <utm-conversions> block available through the schema. The x,y values read from the named header fields <x-coordinate_header_word> and <y-coordinate_header_word> are then taken to be inline and crossline.

If the <utm-conversions> block is supplied, this will force the code to compute x,y's from the linear mapping from inline/crossline to x,y implied by the three non-collinear {x,y,inline,crossline} 4-tuples supplied in this section.

<property_name normalised="false" smooth_across_faults="true"> is a typical property specification; 'normalised' forces truncation to [0,1], and 'smooth_across_faults' will allow kriging/simulation neighbours to come from different segments.

Variograms: <azimuth> specifications on all variograms are GSLIB 2D convention: degrees clockwise, with x as easting, y northing. Lengths are in UTM units.

Eclipse input grids. Currently, a common input grid <ECLIPSE_grid_filename> is expected for all layers. <ECLIPSE segments_keyword> is a block centred integer property that labels the fault blocks. Positive numbers are expected. <ECLIPSE_reference_depth_layer_number> is the number of the layer in the Eclipse model that corresponds to the depth surface from which the model will be hung. It should correspond to the same physical layer tagged by <master_depth_layer_number> in the XML file controlling the Delivery inversion. The actual reference layer number might differ if the Eclipse model contains extra layers above the inversion model. <ECLIPSE_layer_number> identifies the <inversion_layer_number> within the <layer> block with the correct layer of the Eclipse model. The <ECLIPSE_layer_number> entries will form a simple unit-ascending sequence in the XML file.

Eclipse output grids. The runtime option -ecl will write massaged properties (most-likely, realisations) into an output Eclipse grid whose file name(s) are prefixed by the content of <ECLIPSE_output_grid_filename>.

<well_observation> entries in each layer are optional. Positions are in UTM's again. Entries for properties that are not 'massaged' will be ignored.

<stats> blocks within a layer define a depth window within which contributions to the volumetric statistics can be made. For example, if a fluid contact depth is known, suitable entries here will permit the distribution of net-sand above a contact depth to be formed.

<decorations>

Appendix 2: Output Files

The code produces a variety of output files, with names constructed from relevant entries in the master XML file. The simpler files are in naive geoEAS ascii format used by GSLIB (Deutsch and Journal, 1998) for ease of parsing. Stochastic outputs ('realisations') are generated if the -N number flag is supplied.

If ascii-mode is used (runtime flag -a)
post_massaged_properties_layer_*.txt is a geoEAS file containing columns for the gridpoint locations, segments, and most-likely values and standard deviations for all the properties in the layer implied by the filename.
post_massaged_realisations_layer_*.txt is geoEAS, with columns for the gridpoint locations, segments, and stochastic samples for each property and realisation in the layer implied by the filename.

If flies are being written to the cornerpoint grids, we get
A most-likely cornerpoint grid (tagged <ECLIPSE_output_grid_filename>) with the geometry altered in accordance with the massaged layer thicknesses from the inversion, and hung on the nominated reference depth layer. Other properties are written into this file as block-centred, with entries for both the most-likely and standard deviations of each massaged property.
A separate realisation cornerpoint grid file for each realisation, with block-centred values for the properties. Filenames are suffixed versions of the most likely grid.

If volumetric statistics of certain properties are requested (runtime flag --stats), simple ascii files (Realisation_summary_Stats*) with the cumulative distribution of a requested ordering property (e.g. net-sand) are generated.

Appendix 3: The Thin-Layer Detection Problem

The strong nonlinearity of the forward model in the regime of thin-layers makes the correct introduction of trace correlations difficult. Thin layers are always difficult to detect (or reject) with strong probability in single traces, as a layer introduced between identical bounding layers will introduce equal and opposite reflectivities, which will nearly cancel each other in the convolution, and thus produce very weak (i.e. within-noise level) amplitudes. But the inversion at each trace can still provide an (perhaps weakly) updated estimate of the probability p that the layer is present. The case $p \approx \frac{1}{2}$ is most interesting.

There is a simple mapping of this problem to a Bayesian Markov Random Field (MBF) model (Winkler, 2003; Besag, 1986) which offers considerable insight. If we think of an array of traces i characterised by an integer $x_i = \pm 1$ denoting 'layer present/absent' at each trace, then the product of (independent) updated likelihoods $p_i$ over all traces in the set can be written in the form $$p(\{x_i\}) = \exp\left(\sum_i B_i(x_i - a_i)\right), \quad (19)$$

where $B_i = (\frac{1}{2})\log(p_i/(1-p_i))$, and $a_i = (1-(1/B_i)\log p_i)$ are constants that come from setting the odds ratio $$p_i/(1-p_i) \equiv \exp(B_i(+1-a_i))/\exp(B_i(-1-a_i))$$

We may think of the exponent in equation (19) as a (-ve) 'likelihood' Hamiltonian for the problem, which needs to be added to a Hamiltonian expressing the prior mean and correlations between the states $x_i$, as they might plausibly be related in a model prior to any observations (i.e. inversion results). If we write the prior for the model $\{x_i\}$ as a MRF with coupling over nearest neighbours given by the Hamiltonian $$H = -\beta \sum_{j \sim i} x_i x_j,$$

then the prior model corresponds to an Ising model with inverse temperature $\beta$, mean state $\langle x_i \rangle = 0$ (i.e. agnostic view of layer presence/absence), and, in 1d, an exactly derivable correlation function (in the large system limit):

$$\rho_{i,j} \equiv \langle x_i x_j \rangle \sim (\tan h\beta)^{|i-j|}.$$

Clearly the correlation decays geometrically/exponentially between traces, so we define a correlation length $\lambda_c$ by $$\rho_{i,j} \sim (\tan h\beta)^{|i-j|} \equiv \exp(-|i-j|/\lambda_c)$$

Clearly, longer correlations (large $\lambda_c$) correspond to 'colder' temperatures (large $\beta$).

When we add the likelihood Hamiltonian to the prior Hamiltonian, the overall system is $$H = -\beta \sum_{j \sim i} x_i x_j - \sum_i B_i(x_i - a_i), \qquad 5$$

which corresponds exactly to the Bayesian image models discussed by Winkler (2003), in the binary case. Exact MAP estimated of the most probable state can be computed by annealing or the Ford-Fulkerson algorithm (Greig et al., 1989).

Some insight into the effect of the correlations can gleaned by considering the one dimensional case with a common update probability $p=p_i$. This then corresponds to the Ising model in an external magnetic field B. The question of interest is then, given a set of (identical) likelihood updates at each trace corresponding to $B=(\frac{1}{2})\log(p/(1-p))$, what is the expected state of the system. This corresponds precisely to the mean Ising magnetisation, which is known (Thompson, 1972) for the 1 D case to be $$\langle x \rangle = \frac{\sinh B}{\sqrt{e^{-4\beta} + \sinh^2 B}} \qquad (20)$$

$$= \frac{\left(\frac{1}{2}\right)\left(\sqrt{\frac{p}{(1-p)}} - \frac{(1-p)}{p}\right)}{\sqrt{\tanh^2\left(\frac{1}{2\lambda_c}\right) + \left(\sqrt{\frac{p}{(1-p)}} - \frac{(1-p)}{p}\right)^2}} \qquad (21)$$

Graphs of this curve show that the correlation in the prior strongly 'corroborates' any weak inclinations in the likelihood p. E.g. for a correlation length $\lambda_c$=10 and p=0.6, the expected state is almost certainly 'layer present'.

Figure 11:
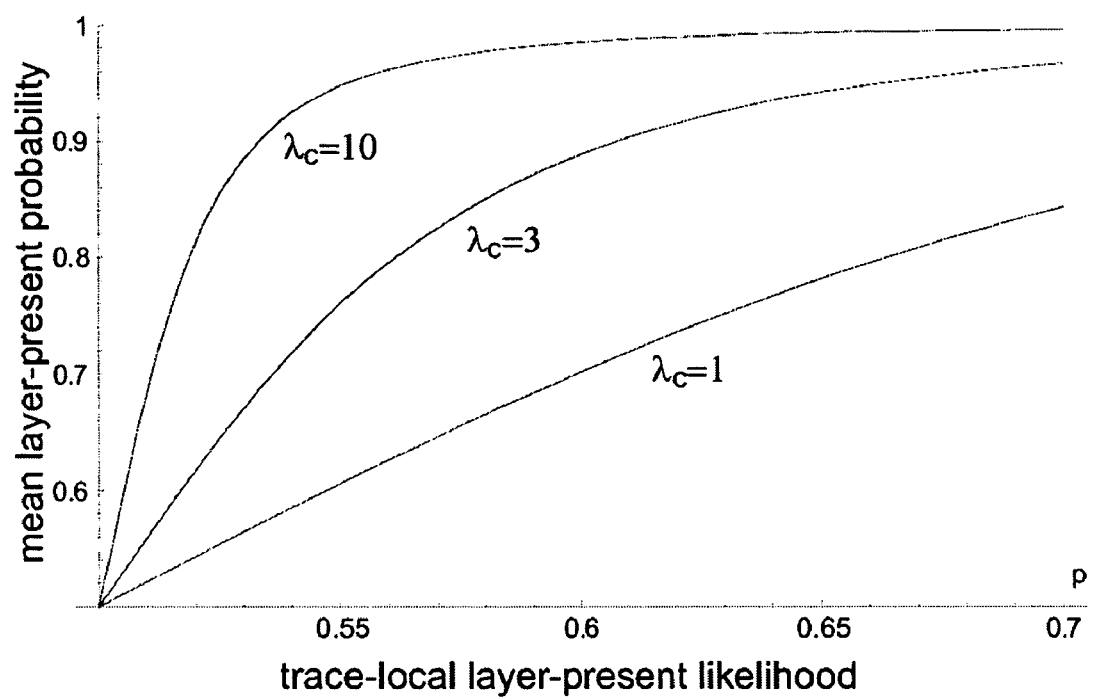
FIG. 11 is a plot of mean layer-present probability illustrating an Ising model.

FIG. 11 shows the mean 'layer present' probability for Ising system with various correlation lengths λ, versus trace-update probability p.

This behaviour is reasonable: we expect a particular observation to be repeated many times if the correlation lengths are long, and if the observations are truly independent, the multiplication of probabilities forces the 'suspected' state to be very much more likely. In the inversion context, we would have to be very careful with asserting true independence of observations, since the imaged amplitudes may well have systematic effects from the processing or other geological effects in the overburden.

The invention claimed is:

1. A method for estimating and/or reducing uncertainty in reservoir models of potential petroleum reservoirs, the method comprising the steps of:
   (a) receiving the results of a stochastic seismic inversion which provides output ensembles in respect of a plurality of properties on the basis of imaged seismic data obtained at points on an imaged seismic input grid over a region to be modelled, the output ensembles including information regarding the values of the plurality of properties at points on the input grid for a sequence of model layers, including means and covariances for the properties,
   (b) assembling information regarding an observed fault structure in the region,
   (c) assembling well log data in respect of one or more properties, obtained from well locations within the region,
   (d) modifying the geometry of the input grid to form an output grid for each layer, based on the observed fault structure and the seismic inversion results,
   (e) interpolating the values of the plurality of properties from the points on the input grid onto the output grid,
   (f) spatially smoothing the means and covariances of the output ensembles to produce a smooth trend map for each property and a smooth inter-property trend covariance,
   (g) performing a kriging adjustment of the property trends on the basis of the well log data so that the trends pass through the well log data,
   (h) simulating a set of spatially correlated random fields on the output grid for each property, and generating a set of realisations for each property on the basis of the random fields, the smooth inter-property trend covariance and the property trend maps, which honour inter-property and inter-layer correlations from the seismic inversion and measured well data, and
   (i) using the generated realisations in a reservoir model to conduct flow simulation and/or volumetric calculations in respect of the region.

2. A method as claimed in claim 1, wherein in step (h) the properties include layer thickness and the realisations include realisations of the structure of the region formed by simulating the layer thickness, while honouring the fault structure.

3. A method as claimed in claim 1, wherein in step (i) the realisations are used to make a single or multiple reservoir model(s) to estimate the most likely production profiles and/or uncertainty in the production profile, as well as the most likely in place volume and/or the uncertainty or uncertainty range of those volumes.

4. A method as claimed in claim 1, further comprising prior to step (h), the step of:
   applying a set of geological constraints to the trend maps, the geological constraints including continuity requirements in respect of one or more properties between layers and/or across faults, wherein the set of realisations generated step (h) further honour the set of geological constraints.

5. A method as claimed in claim 1, further comprising the step of simulating the spatial dispersion of material within a layer of the seismic inversion by vertically subdividing the layer and modelling a vertical distribution of impermeable material within the layer consistently with a vertical average of impermeable material content obtained from the seismic inversion.

6. A method as claimed in claim 5, wherein the impermeable material is modelled as objects, the dimensions of which are drawn randomly from estimated distributions, and the location and dimensions of which are annealed using maximum a posteriori probabilities constructed from the seismic inversion results.

7. A method as claimed in claim 6, wherein the constructed probabilities are further conditional to trends specified from geologic concepts or geophysical surveys.

8. A method as claimed in claim 5, wherein downscaled layer thicknesses are modelled as being drawn from truncated Gaussian processes, and simulated using hierarchical sampling for auxiliary and continuous variables which specify the active layers and the joint downscaled thickness distributions, respectively, at a particular trace.

9. A method as claimed in claim 8, wherein the simulation proceeds by blocks or strictly tracewise in a sequential manner using a sequential algorithm which samples from the posterior distribution for the sublayer thicknesses, and is dependent on variograms supplied by a user, well data, and the accumulating history of the algorithm.

10. A method as claimed in claim 3, wherein the spatial dispersion simulation step uses a truncated Gaussian field technique, using values of net-to-gross (NG) obtained from the seismic inversion.

11. A method as claimed in claim 10, further comprising the steps of: receiving a 3D variogram describing the spatial continuity of the underlying Gaussian field, generating and solving a set of simple kriging (SK) equations for different areas on the output grid using the variogram, forming a truncated Gaussian field using an obtained value of NG for each area, forming a set of realisations of the underlying Gaussian field for each area and selecting a realisation having a best match to the NG for the area.

12. A method as claimed in claim 5, further comprising the steps of:
(a) performing an initial subgridding to a specified resolution and geometry, followed by
(b) performing a sequential truncated Gaussian simulation for the rock categories which is stochastically optimised to match the net-to-gross (NG) values produced by the seismic inversion, using a truncated Gaussian threshold computed from the target NG.

13. A method as claimed in claim 12, wherein the stochastic optimisation is performed by a greedy selection of the best match from multiple simulations of sets of gridblocks in a column, with the columns of the output grid visited in a multigrid sequence to ensure reproduction of the longest length scales of a supplied variogram.

14. A method as claimed in claim 1, wherein the set of spatially correlated random fields is generated using a p-field technique.

15. A method as claimed in claim 1, wherein the output grid is a cornerpoint grid.

16. A method as claimed in claim 1, wherein the means of the output ensembles are smoothed onto the output grid using a moving average filter with weights based on the covariance between the properties and layers.

17. A method as claimed in claim 1, wherein the seismic inversion provides a covariance matrix coupling all of the layers and properties, and in the spatial smoothing step the covariance matrix is smoothed back onto the input grid of the seismic inversion.

18. A method as claimed in claim 1, wherein the realisations are generated using a normalised kriging variance map calculated in the kriging adjustment step.

19. A computer program for implementing the method according to claim 1 on a computer.

20. A computer program product directly loadable into the internal memory of a digital computer, comprising software code portions for performing the method steps of claim 1 when said product is run on a computer.

21. A computer readable medium on which is recorded a computer program, wherein the program causes the computer to execute the method steps of claim 1.

* * * * *